US009779000B2

(12) United States Patent
Narang et al.

(10) Patent No.: US 9,779,000 B2
(45) Date of Patent: Oct. 3, 2017

(54) METHOD AND APPARATUS FOR SUPPORTING HIGH AVAILABILITY

(71) Applicant: Cisco Technology, Inc., San Jose, CA (US)

(72) Inventors: Rajeev Narang, Bangalore (IN); Mark L. Hendrickson, Lafayette, CO (US); Somashekar S V, Bangalore (IN); Subramanian Thamaraisamy, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 52 days.

(21) Appl. No.: 14/835,370

(22) Filed: Aug. 25, 2015

(65) Prior Publication Data

US 2017/0060708 A1 Mar. 2, 2017

(51) Int. Cl.
| | |
|---|---|
| G06F 11/30 | (2006.01) |
| G06F 11/20 | (2006.01) |
| H04L 29/06 | (2006.01) |
| H04L 12/703 | (2013.01) |
| H04L 12/707 | (2013.01) |

(52) U.S. Cl.
CPC .......... *G06F 11/2033* (2013.01); *H04L 45/28* (2013.01); *H04L 65/1006* (2013.01); *G06F 2201/805* (2013.01); *H04L 45/22* (2013.01)

(58) Field of Classification Search
CPC .. G06F 11/2033; H04L 65/1006; H04L 45/22; H04L 45/28
See application file for complete search history.

(56) References Cited

U.S. PATENT DOCUMENTS

| | | | |
|---|---|---|---|
| 2005/0213498 A1* | 9/2005 | Appanna | G06F 11/2028 370/216 |
| 2008/0219268 A1 | 9/2008 | Dennison | |
| 2008/0291906 A1* | 11/2008 | Chigurupati | H04L 45/00 370/356 |
| 2012/0079031 A1* | 3/2012 | Matthews | H04L 12/18 709/206 |

OTHER PUBLICATIONS

International Search Report and Written Opinion mailed Nov. 17, 2016 for corresponding PCT application No. PCT/US2016/048487.

* cited by examiner

*Primary Examiner* — Yolanda L Wilson
(74) *Attorney, Agent, or Firm* — Polsinelli PC (57) ABSTRACT

In one embodiment, a network interruption may be determined to have occurred at an active node of a communication system, wherein the active node may be facilitating a first communication dialog between a first end point and a second end point. In response to the network interruption, a stateful switchover can be initiated between the active node and a standby node of the communication system. A reroute message may be transmitted to the first end point and the second end point, wherein the reroute message can instruct the first end point and the second end point to cease use of the first communication dialog and begin use of a second communication dialog, wherein the second communication dialog may be facilitated by the standby node.

20 Claims, 7 Drawing Sheets

METHOD AND APPARATUS FOR SUPPORTING HIGH AVAILABILITY

TECHNICAL FIELD

The present technology pertains to computer-based networking, and more specifically to supporting high availability (HA) in a signaling plane of a communications controller.

BACKGROUND

Recent industry-wide shifts toward cloud-based service delivery and data consumption present new challenges for service providers to route and deliver data with minimal network delay, as well as adjust network resource usage according to changing needs of network users. For example, cloud-based providers often employ various real-time adjustment models to efficiently adapt and allocate network resources based on changing business needs. Further, in order to efficiently serve consumers according to service assurance processes, cloud-based providers typically employ various network management tools to monitor system diagnostics, perform system analytics, correct network errors, and the like. Enterprises such as 911 emergency services, hospitals, and major call centers rely on their telephony networks to perform with high availability (HA) to ensure that vital communications are not delayed or lost.

Emerging computer-based applications are accelerating a need for increasingly robust and efficient network functions. Due to the enormous number of parallel network tasks that are managed in real time, advances in network data management and performance may be desired. In a computer-based network, traffic is sometimes delayed due to interruptions that may occur at one or more nodes, interfaces, or checkpoints in the network. Users, such as 911 emergency services, hospitals, and major call centers, cannot function optimally without high availability of network resources to provide essential tasks.

BRIEF DESCRIPTION OF THE DRAWINGS

In order to describe the manner in which the above-recited features and other advantages of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting its scope, the principles herein are described and explained with additional specificity and detail through the use of the accompanying drawings in which.

A component or a feature that is common to more than one drawing is indicated with the same reference number in each of the drawings.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

In some embodiments, the present technology may determine that a network interruption has occurred at an active node of a communication system, wherein the active node may be facilitating a first communication dialog between a first end point and a second end point. In response to the network interruption, a stateful switchover can be initiated between the active node and a standby node of the communication system. A reroute message may be transmitted to the first end point and the second end point, wherein the reroute message can instruct the first end point and the second end point to cease use of the first communication dialog and begin use of a second communication dialog, wherein the second communication dialog may be facilitated by the standby node. These and other features are disclosed in greater detail below.

DESCRIPTION

A communication network can include a system of hardware, software, protocols, and transmission components that collectively allow separate devices to communicate, share data, and access resources, such as software applications. More specifically, a computer network may be a geographically distributed collection of nodes interconnected by communication links and segments for transporting data between end points, such as personal computers, portable devices, and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs may connect nodes over dedicated private communications links located in the same general physical location, such as a building or campus. WANs, on the other hand, may connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a public WAN that connects disparate networks throughout the world, providing global communication between nodes on various networks. The nodes can communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points, which can effectively extend the size or footprint of the network.

Networks can be segmented into sub-networks to provide a hierarchical, multilevel routing structure. For example, a network can be segmented into sub-networks using subnet addressing to create network segments. This way, a network can allocate various groups of IP addresses to specific network segments and divide the network into multiple logical networks.

Other networks, such as virtual networks (e.g., VLANs) are also available. For example, one or more LANs can be logically segmented to form a VLAN and allow a group of machines to communicate as if they were in the same physical network, regardless of their actual physical location. Thus, machines located on different physical LANs can communicate as if they were located on the same physical LAN. Interconnections between networks and devices can also be created using routers and tunnels, such as VPN tunnels, as is appreciated by those skilled in the art.

The various networks can include various hardware or software appliances or nodes to support data communications, security, and provision services. For example, networks can include routers, hubs, switches, APs, firewalls, repeaters, intrusion detectors, servers, VMs, load balancers, application delivery controllers (ADCs), and other hardware or software appliances. Such appliances can be distributed or deployed over one or more physical, overlay, or logical networks. Moreover, appliances can be deployed as clusters, which can be formed using layer 2 (L2) and layer 3 (L3) technologies. Clusters can provide high availability, redundancy, and load balancing for flows associated with specific appliances or nodes. A flow can include packets that have the same source and destination information. Thus, packets originating from device A to service node B can all be part of the same flow.

Appliances or nodes, as well as clusters, can be implemented in cloud deployments. Cloud deployments can be provided in one or more networks to provision computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, network devices, applications, virtual machines (VMs), services, and so forth. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc. Also, services may include various types of services, such as monitoring services, management services, communication services, data services, bandwidth services, routing services, configuration services, wireless services, architecture services, etc.

Cloud controllers and/or other cloud devices can be configured for cloud management. These devices can be pre-configured (i.e., come "out of the box") with centralized management, layer 7 (L7) device and application visibility, real time web-based diagnostics, monitoring, reporting, management, and so forth. As such, in some embodiments, the cloud can provide centralized management, visibility, monitoring, diagnostics, reporting, configuration (e.g., wireless, network, device, or protocol configuration), traffic distribution or redistribution, backup, disaster recovery, control, and any other service. In some cases, this can be done without the cost and complexity of specific appliances or overlay management software.

The disclosed technology may address a need in the art for high availability of network resources during voice or other media communications. Examples of other media communications are video communication, database communication, streaming media applications such as desktop sharing, web conferencing, shared whiteboard, and the like. In some embodiments, the disclosed systems, methods, and non-transitory computer-readable media may provide high availability of network resources during a network interruption.

High availability or high network availability may refer to network-wide resilience to downtime caused by network interruptions. Network interruptions may include failure of a network node, removal of the network node, maintenance of the network node, or any other activity which may cause an interruption in network service. High availability can provide continuous access to communications, applications, data, and content anywhere or any time by addressing potential causes of downtime with functionality and design measures that may provide redundancy and backup recovery options to nodes of the network if a network interruption occurs. In some embodiments, the present technology may provide a user with seamless service such that, when a network interruption occurs, it is not detected or noticed by the user of the network. For example, the present technology can detect the network interruption and seamlessly provide alternate paths for signaling communication to travel in order to reach its intended destination without unnecessary delay, such as by utilizing a backup server to host the signaling communication.

Likewise, in some embodiments, high availability may refer to redundancy measures that store backup data which can be used in the event of a network interruption. In some embodiments, a redundancy measure is providing backup nodes to primary nodes of a network. A backup node may copy essential communication data from a primary node in order to provide the copied communication data to the communication system in the event that communications cannot be routed through the primary node.

Figure 1:
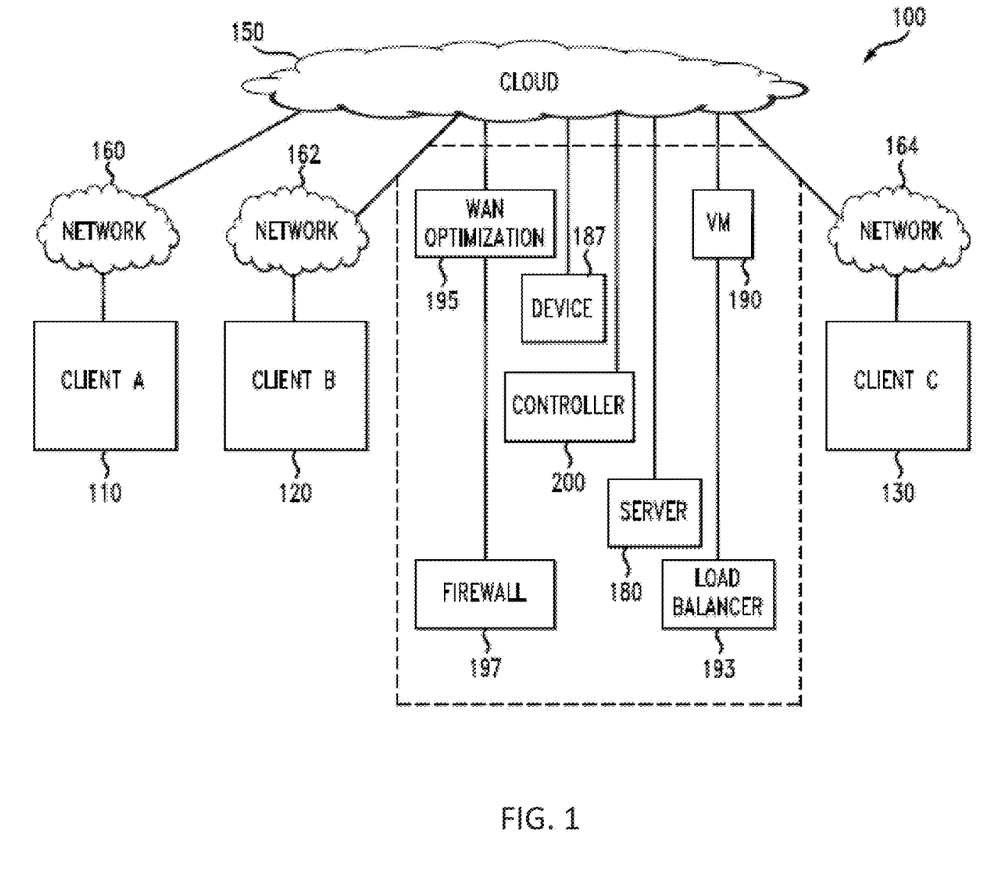
FIG. 1 illustrates an example cloud architecture including nodes and devices interconnected by various methods of communication.

In some embodiments, the present technology can be utilized in a cloud computing environment. For example, an exemplary cloud or virtual computing environment is provided in FIG. 1. FIG. 1 illustrates an example cloud architecture 100 including nodes and devices interconnected by various methods of communication. Cloud 150 can be a public, private, and/or hybrid cloud system which may include one or more public and private cloud networks in communication with each other. Cloud 150 can include resources, such as one or more Firewalls 197; Load Balancers 193; WAN optimization platforms 195; devices 187, such as switches, routers, intrusion detection systems, Auto VPN systems, or any hardware or software network device; one or more servers 180, such as a primary use network server, a data backup server, dynamic host configuration protocol (DHCP), domain naming system (DNS), or storage servers; virtual machines (VMs) 190; controllers, such as a communications controller 200 or a management device.

Cloud resources can be physical, software, virtual, or any combination thereof. For example, a cloud resource can include a server running one or more VMs or storing one or more databases. Moreover, cloud resources can be provisioned based on requests (e.g., client or tenant requests), schedules, triggers, events, signals, messages, alerts, agreements, necessity, or any other factor. For example, cloud 150 can provision network recovery services, application services, software development services, database services, storage services, management services, monitoring services, configuration services, administration services, backup services, disaster recovery services, bandwidth or performance services, intrusion detection services, VPN services, or any type of services to any device, server, network, client, or tenant.

In addition, cloud 150 can handle traffic and/or provision services. For example, cloud 150 can provide network routing/re-routing services, network data backup services, configuration services, such as auto VPN, automated deployments, automated wireless configurations, automated policy implementations, and the like. In some embodiments, the cloud 150 can collect data about a client or network and generate configuration settings for specific service, device, or networking deployments. For example, the cloud 150 can generate security policies, subnetting and routing schemes, forwarding schemes, NAT settings, VPN settings, and/or any other type of configurations. The cloud 150 can then push or transmit the necessary data and settings to specific devices or components to manage a specific implementation or deployment. For example, the cloud 150 can generate VPN settings, such as IP mappings, port number, and security information, and send the VPN settings to specific, relevant device(s) or component(s) identified by the cloud 150 or otherwise designated. The relevant device(s) or component(s) can then use the VPN settings to establish a VPN tunnel according to the settings. As another example, the cloud 150 can generate and manage network diagnostic tools or graphical user interfaces.

Furthermore, cloud 150 can provide specific services for clients—namely, client A 110, client B 120, and client C 130. For example, cloud 150 can deploy a network or specific network components, configure links or devices, automate services or functions, or provide any other services for the clients. Other non-limiting example services performable by cloud 150 can include network administration services, network monitoring services, content filtering services, application control, WAN optimization, firewall services, gateway services, storage services, protocol configuration services, wireless deployment services, and so forth.

To this end, the clients can connect with cloud 150 through networks 160, 162, and 164, respectively. More specifically, client A 110, client B 120, and client C 130 can each connect with cloud 150 through networks 160, 162, and 164, respectively, in order to access resources from cloud 150, communicate with cloud 150, or receive any services from cloud 150. Networks 160, 162, and 164 can each refer to a public network, such as the Internet; a private network, such as a LAN; a combination of networks; or any other network, such as a VPN or an overlay network.

Moreover, the clients can each include one or more networks. For example, client A 110, client B 120, and client C 130 can each include one or more LANs and VLANs. In some cases, a client can represent one branch network, such as a LAN, or multiple branch networks, such as multiple remote networks. For example, client A 110 can represent a single LAN network or branch, or multiple branches or networks, such as a branch building or office network in Los Angeles and another branch building or office network in New York. If a client includes multiple branches or networks, the multiple branches or networks can each have a designated connection to the cloud 150. For example, each branch or network can maintain a tunnel to the cloud 150. Alternatively, all branches or networks for a specific client can connect to the cloud 150 via one or more specific branches or networks. For example, traffic for the different branches or networks of a client can be routed through one or more specific branches or networks. Further, client A 110, client B 120, and client C 130 can each include one or more routers, switches, appliances, client devices, VMs, or any other devices.

Each client can also maintain links between branches. For example, client A can have two branches, and the branches can maintain a link between each other. Thus, in some cases, branches can maintain a tunnel between each other, such as a VPN tunnel. Moreover, the link or tunnel between branches can be generated and/or maintained by the cloud 150. For example, the cloud 150 can collect network and address settings for each branch and use those settings to establish a tunnel between branches. In some cases, the branches can use a respective tunnel between the respective branch and the cloud 150 to establish the tunnel between branches. For example, branch 1 can communicate with cloud 150 through a tunnel between branch 1 and cloud 150 to obtain the settings for establishing a tunnel between branch 1 and branch 2. Branch 2 can similarly communicate with cloud 150 through a tunnel between branch 2 and cloud 150 to obtain the settings for the tunnel between branch 1 and branch 2.

In some cases, cloud 150 can maintain information about each client network, in order to provide or support specific services for each client, such as network traffic monitoring, network traffic routing/re-routing, security, or VPN services. Cloud 150 can also maintain one or more links or tunnels to the clients. For example, cloud 150 can maintain a VPN tunnel to one or more devices in client A's network. In some cases, cloud 150 can configure the VPN tunnel for a client, maintain the VPN tunnel, or automatically update or establish any link or tunnel to the client or any devices of the client.

The cloud 150 can also monitor device and network health and status information for client A 110, client B 120, and client C 130. To this end, client A 110, client B 120, and client C 130 can synchronize information with cloud 150. Cloud 150 can also manage and deploy services for the clients. For example, cloud 150 can collect network information about client A 110 and generate network and device settings to automatically deploy a service for client A 110. In addition, cloud 150 can update device, network, and service settings for the clients.

Those skilled in the art will understand that the cloud architecture 150 can include any number of nodes, devices, links, networks, or components. In fact, embodiments with different numbers and/or types of clients, networks, nodes, cloud components, servers, software components, devices, virtual or physical resources, configurations, topologies, services, appliances, deployments, or network devices are also contemplated herein. Further, cloud 150 can include any number or types of resources, which can be accessed and utilized by clients or tenants. The illustration and examples provided herein are intended for clarification of some embodiments of the present technology.

Moreover, as far as communications, packets (e.g., traffic and/or messages) can be exchanged among the various nodes and networks in the cloud architecture 100 using specific network protocols. In particular, packets can be exchanged using wired protocols, wireless protocols, security protocols, OSI-Layer specific protocols, or any other protocols. Some non-limiting examples of protocols can include Session Initiation Protocol (SIP), protocols from the Internet Protocol Suite, such as TCP/IP; OSI (Open Systems Interconnection) protocols, such as L1-L7 protocols; routing protocols, such as RIP, IGP, BGP, STP, ARP, OSPF, EIGRP, NAT; or any other protocols or standards, such as HTTP, SSH, SSL, RTP, FTP, SMTP, POP, PPP, NNTP, IMAP, Telnet, SSL, SFTP, WIFI, Bluetooth, VTP, ISL, IEEE 802 standards, L2TP, IPSec, etc. In addition, various hardware and software components or devices can be implemented to facilitate communications both within a network and between networks. The various hardware and software components or devices can also be referred to as nodes and some examples are switches, hubs, routers, access points (APs), antennas, network interface cards (NICs), modules, cables, firewalls, servers, repeaters, sensors, and the like.

Figure 2:
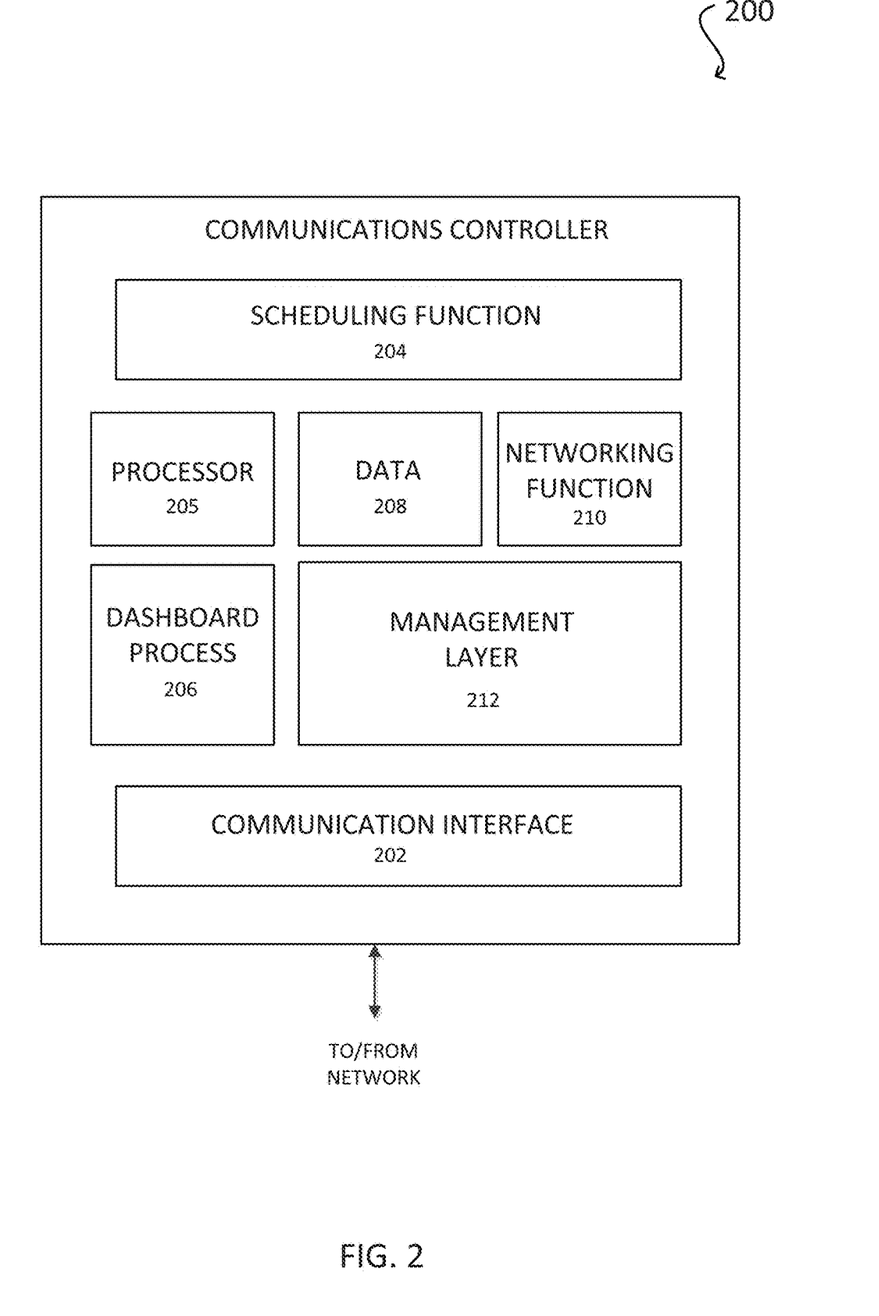
FIG. 2 illustrates an example cloud service management system.

FIG. 2 illustrates a schematic block diagram of an example communications controller 200. Communications controller 200 can serve as a cloud service management system for cloud 150. In particular, communications controller 200 can manage cloud operations, client communications, service provisioning, network configuration and monitoring, and the like. For example, communications controller 200 can manage cloud service provisioning, such as cloud storage, media, streaming, security, or administration services. In some embodiments, communications controller 200 can manage VMs; networks, such as client networks or software-defined networks (SDNs); service provisioning; and the like.

Communications controller 200 can include several subcomponents, including hardware and software components such as a scheduling function 204, a processor 205, a dashboard process 206, data 208, a networking function 210, a management layer 212, and a communication interface 202. The various subcomponents can be implemented as hardware and/or software components (e.g., processor 205, memory, data structures, etc.). Moreover, although FIG. 2 illustrates one example configuration of the various components of communications controller 200, those of skill in the art will understand that the components can be configured in a number of different ways and can include any other type and number of components. For example, networking function 210 and management layer 212 can belong to one software module or multiple separate modules. Other modules can be combined or further divided up into more subcomponents.

Scheduling function 204 can manage scheduling of procedures, events, or communications. For example, scheduling function 204 can schedule when resources should be allocated from cloud 150. As another example, scheduling function 204 can schedule when specific instructions or commands should be transmitted to the network (e.g., one or more client devices). In some cases, scheduling function 204 can provide scheduling for operations performed or executed by the various subcomponents of communications controller 200. Scheduling function 204 can also schedule resource slots, virtual machines, bandwidth, device activity, status changes, nodes, updates, and the like.

Dashboard process 206 can provide an interface or front end where clients can access, consume, and generally monitor cloud services. For example, dashboard process 206 can provide a web-based frontend where clients can configure client devices or networks that are cloud-managed, provide client preferences, specify policies, enter data, upload statistics, configure interactions or operations, etc. In some cases, dashboard process 206 can provide visibility information, such as views of client networks or devices, and even provide diagnostic information, discussed in greater detail below—e.g., dashboard process 206 can provide a view of the status or conditions of the client's network, the operations taking place, services, performance, a topology or layout, specific network devices, protocols implemented, running processes, errors, notifications, alerts, network structure, ongoing communications, data analysis, etc.

In some cases, dashboard process 206 provide a graphical user interface (GUI) for the client to monitor the client network, the devices, statistics, errors, notifications, etc., and even make modifications or setting changes through the GUI. The GUI can depict charts, lists, tables, tiles, network trees, maps, topologies, symbols, structures, or any graphical object or element. In addition, the GUI can use color, font, shapes, or any other characteristics to depict scores, alerts, or conditions. In some cases, dashboard process 206 can also handle user or client requests. For example, the client can enter a service request through dashboard process 206.

Data 208 can include any data or information, such as management data, statistics, settings, preferences, profile data, logs, notifications, attributes, configuration parameters, client information, network information, and the like. For example, communications controller 200 can collect network statistics from the client and store the statistics as part of data 208. In some cases, data 208 can include performance and/or configuration information. This way, communications controller 200 can use data 208 to perform management or service operations for the client. Data 208 can be stored on a storage or memory device on communications controller 200, a separate storage device connected to communications controller 200, or a remote storage device in communication with communications controller 200.

Networking function 210 can perform networking calculations, such as network addressing, or networking service or operations, such as auto VPN configuration or traffic routing/re-routing. For example, networking function 210 can perform filtering functions, switching functions, failover functions, high availability functions, network or device deployment functions, resource allocation functions, messaging functions, traffic analysis functions, port configuration functions, mapping functions, packet manipulation functions, path calculation functions, loop detection, cost calculation, error detection, or otherwise manipulate data or networking devices. In some embodiments, networking function 210 can handle networking requests from other networks or devices and establish links between devices. In other embodiments, networking function 210 can perform queueing, messaging, or protocol operations.

Management layer 212 can include logic to perform management operations. For example, management layer 212 can include the logic to allow the various components of communications controller 200 to interface and work together. Management layer 212 can also include the logic, functions, software, and procedure to allow communications controller 200 to perform monitoring, management, control, and administration operations of other devices, cloud 150, the client, applications in cloud 150, services provided to the client, or any other component or procedure. Management layer 212 can include the logic to operate communications controller 200 and perform particular services configured on communications controller 200.

Moreover, management layer 212 can initiate, enable, or launch other instances in communications controller 200 and/or cloud 150. In some embodiments management layer 212 can also provide authentication and security services for cloud 150, the client, controller 200, and/or any other device or component. Further, management layer 212 can manage nodes, resources, VMs, settings, policies, protocols, communications, and the like. In some embodiments, management layer 212 and networking function 210 can be part of the same module. However, in other embodiments, management layer 212 and networking function 210 can be separate layers and/or modules.

Communications interface 202 allows communications controller 200 to communicate with the client, as well as any other device or network. Communications interface 202 can be a network interface card (NIC), and can include wired and/or wireless capabilities. Communications interface 202 allows communications controller 200 to send and receive data from other devices and networks. In some embodiments, communications controller 200 can include multiple communications interfaces for redundancy or failover. For example, communications controller 200 can include dual NICs for connection redundancy.

As discussed above, conventional approaches for providing network connectivity among network resources may not be adequate to handle the increasing demands on modern communication networks, especially considering the size of modern large-scale networks and the enormous amount of network traffic operations that may simultaneously occur throughout the networks. Likewise, unified communications are becoming increasingly in demand as network users seek a single point of access for multiple network operations.

In some embodiments, unified communications can combine various network components to provide a user a single point of access to the various network components. Non-limiting examples of network components are routers, gateways, applications, voice over internet protocol (VOIP) devices, VOIP phones, non-VOIP phones, session initiation protocol (SIP) phones, voicemail applications, external networks, and the like.

Figure 3:
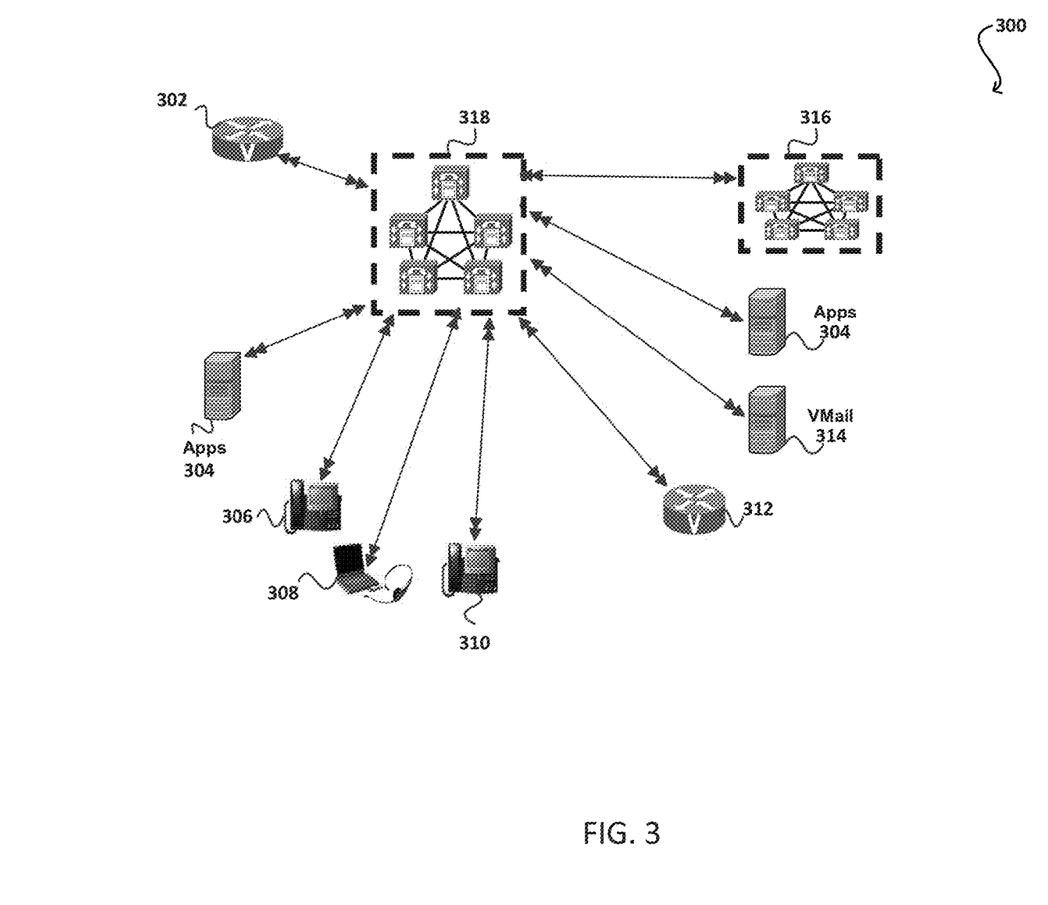
FIG. 3 illustrates an example topology for a communication system.

FIG. 3 illustrates an example topology for a unified communications system 300. Unified communications system 300 can include routers 302, application servers 304, Skinny Client Control Protocol (SCCP) phones 306, softphones 308, IP phones 310, gateways 312, voicemail servers 314, external networks 316, internal networks 318, and the like. Unified communications system 300 can utilize multiple nodes or checkpoints in determining routing of network traffic and/or handling of call control routing. A person of skill in the art will recognize that communications system 300 may encompass more or fewer elements than illustrated by FIG. 3. Furthermore, it is understood that embodiments of the present technology may utilize other communications systems in addition or in place of unified communications system 300.

Figure 4:
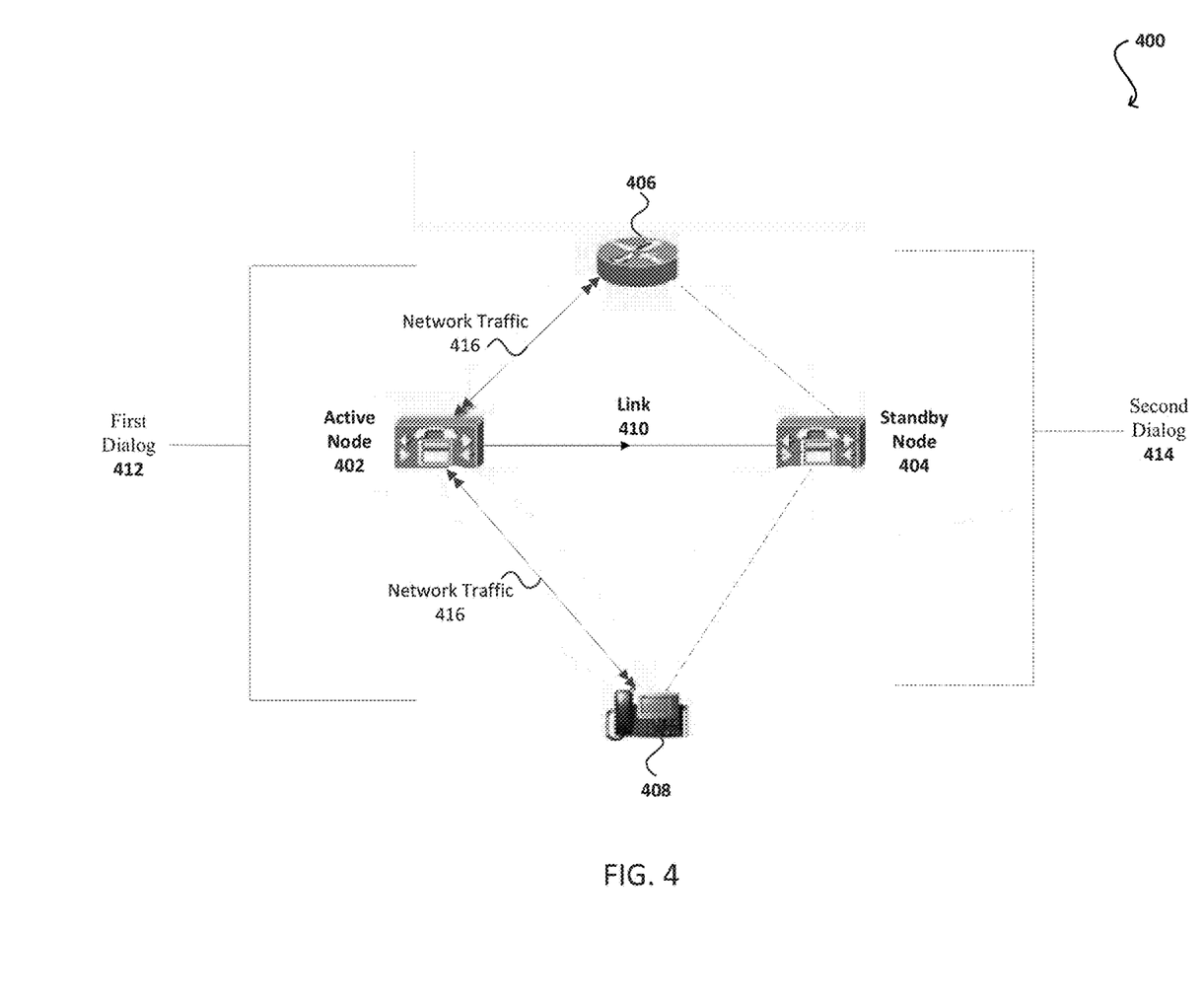
FIG. 4 illustrates an example topology for nodes of a communication system.

FIG. 4 illustrates an example high availability topology 400 which may be utilized, for example, in unified communications system 300. High availability topology 400 can be configured to enable communication dialogs between multiple nodes in a network and, in response to a detected network interruption, seamlessly provide alternate paths for communication data to travel in order to reach its intended destination.

A communication dialog may be any transmission of information, data, or network traffic that occurs between nodes of a communication network, such that the nodes involved in the communication dialog can send and/or receive data to each other. For example, a communication dialog can be data transferred to facilitate a VOIP call or video conference. Furthermore, it is understood that embodiments of the present technology may utilize more or fewer elements in high availability topology 400 than are shown in FIG. 4.

As shown, high availability topology 400 can include active node 402 and standby node 404. Active node 402 and standby node 404 may each be any type of active electronic device attached to the network that is capable of creating, receiving, or transmitting information over a communications channel to facilitate a communication dialog between multiple endpoints, such as VOIP phone 408 and gateway 406.

To facilitate a communication dialog between endpoints, active node 402 and standby node 404 can be configured to transmit messages to the endpoints of the communication dialog to establish, terminate and/or alter the communication dialog. For example, active node 402 and standby node 404 can utilize a standard protocol such as session initiation protocol (SIP).

To initiate a communication dialog between end points such as VOIP phone 408 and gateway 406, active node 402 can send an invitation message to both VOIP phone 408 and gateway 406 that invites each endpoint to utilize a communication dialog 412 facilitated by active node 402. The invitation message can provide each endpoint with necessary data to initiate the communication dialog, such as an identifier identifying the communication dialog, data identifying active node 402, data identifying the type of data to be exchanged, features to be provided, etc. For example, an invitation message can be a SIP INVITE request that provides an endpoint with the option of connecting to a requesting node by using the data provided in the INVITE request.

In FIG. 4, active node 402 may facilitate communication dialog 412 between gateway 406 and VOIP phone 408, wherein communication data (for example, data packets) can be transmitted and received between gateway 406 and VOIP phone 408 through use of the communication dialog 412.

To provide high availability, standby node 404 can act as a backup or hot standby to replace active node 402 in case of a communication interrupt, such as active node 402 failing or otherwise being unable to facilitate communications between gateway 406 and VOIP phone 408. For example, active node 402 can become unavailable due to a scheduled maintenance, unexpected error, etc.

To prepare for a communication interrupt, standby node 404 can maintain checkpointed dialog information copied from active node 402. The checkpointed dialog information may include data relating to communication dialog 412, such as features provided by active node 402, data indicating a current state of communication dialog 412, etc. Examples of features include supplementary telephony services such as call hold, call transfer, call park, retrieve from park, transfer from park, and call resume that can be associated with VOIP phone 408.

In some embodiments, standby node 404 can periodically request checkpointed dialog information from active node 402. Alternatively, active node 402 can be configured to periodically transmit checkpointed dialog information to standby node 404. Checkpointing or saving of dialog information from active node 402 to standby node 404 may occur at periodic or continuous intervals, or the checkpointing/saving of network dialog information may occur upon the updating of relevant checkpoint data to active node 402. For example, standby node 404 can be updated with backup data from active node 402 every few seconds, every second, continuously, upon determination that active node 402 is updated with new network data, or at some other interval.

Figure 5:
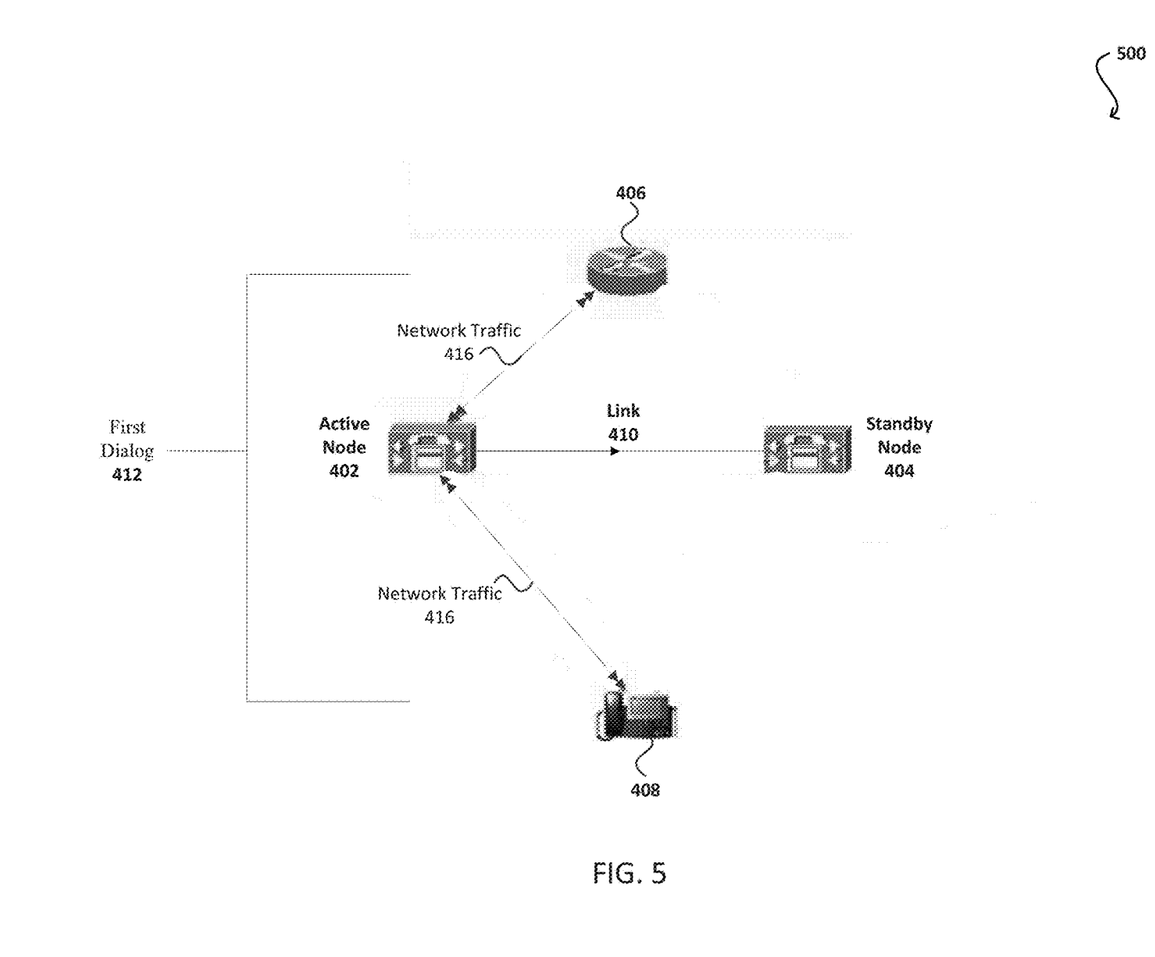
FIG. 5 illustrates an example checkpointing operation in a communication system.

FIG. 5 illustrates an example checkpointing operation 500 in a communication system. As shown, active node 402 can facilitate communication dialog 412 between VOIP phone 408 and gateway 406. During communication dialog 412 checkpointed dialog information can be copied from active node 402 to standby node 404 via checkpoint link 410. The checkpointed data may remain unutilized until a network interruption occurs at active node 402.

The checkpointed data can include network routing data and/or SIP dialog and session information that can provide a seamless transition of network traffic/call routing through standby node 404 in the event that a network interruption occurs at active node 402. For example, standby node 404 can maintain a copy of relevant network data from active node 402, allowing for a seamless transition from communication dialog 412 to a communication dialog facilitated by standby node 404 such that no data or network services that were facilitated through active node 402 are lost. In the case that rerouting of network traffic through standby node 404 is needed, a stateful switchover (SSO) can be performed between active node 402 and standby node 404.

Figure 6:
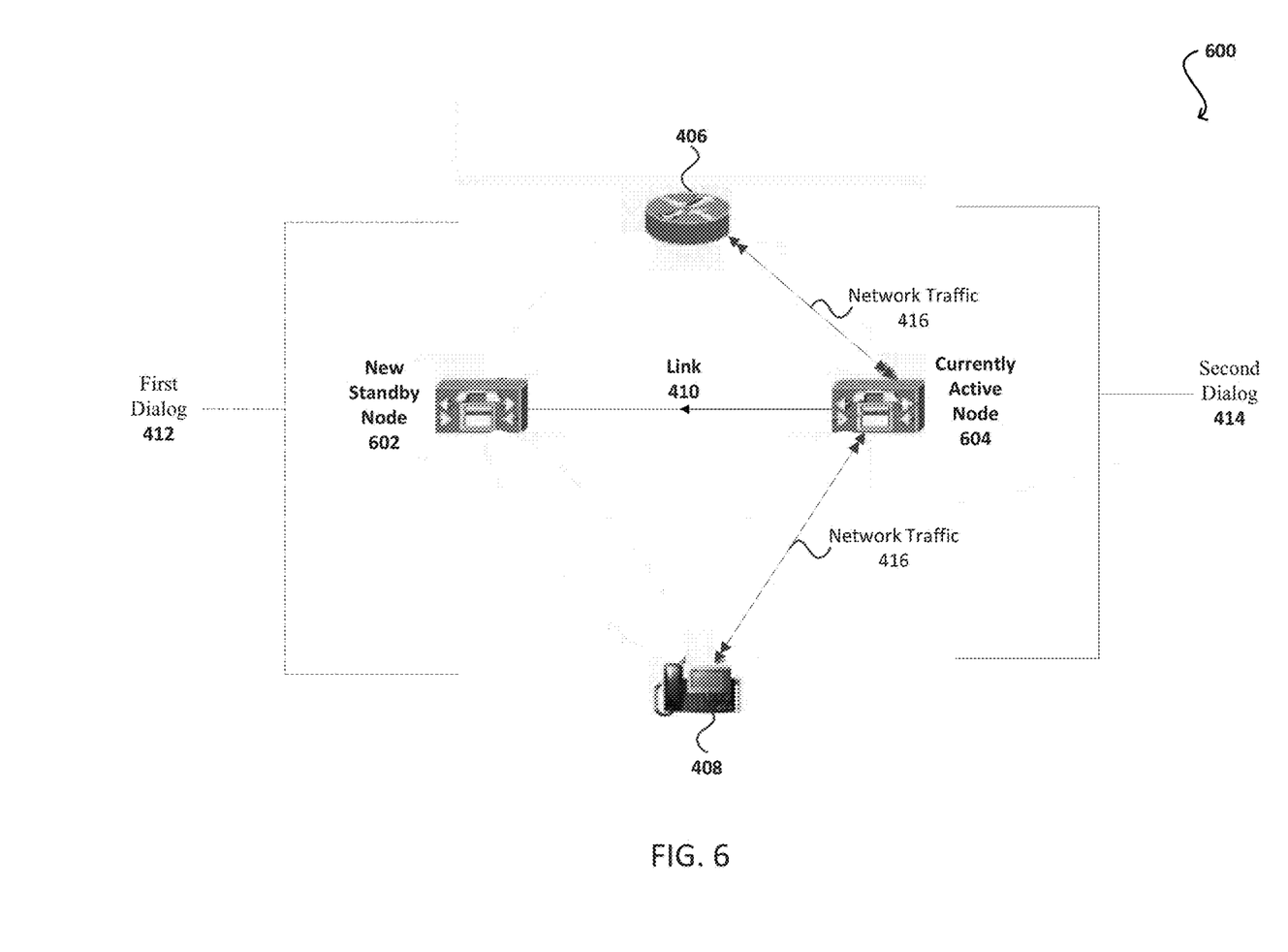
FIG. 6 illustrates an example stateful switchover operation in a communication system.

FIG. 6 illustrates an example stateful switchover operation 600 in a communication system. A stateful switchover operation can be the process of transitioning services provided by one computing node to another node. For example, a stateful switchover between active node 402 and standby node 404 can result in standby node 404 being configured into an identical or near identical state as active node 402. This can allow a seamless transition of a communication dialog from active node 402 to standby node 404.

In some embodiments, active node 402 can initiate a stateful switchover. For example, upon detecting a network interrupt, active node 402 can transmit a stateful switchover command to standby node 404 instructing the standby node to perform the stateful switchover. As another example, in some embodiments, standby node 404 can initiate a stateful switch. For example, standby node 404 can monitor active node 402 and, upon detecting a network interrupt, initiate a stateful switchover. Alternatively, in some embodiments, a stateful switchover can be initiated by another node in the network. For example, another node can monitor active node 402 and, upon detecting a network interrupt transmit a stateful switchover command to active node 402 and/or passive node 404.

To initiate a stateful switchover, in some embodiments, standby node 404 can request and copy any necessary data needed to transition services provided by active node 402 to standby node 404, including any data needed to configure standby node 404 into an identical or near identical state as active node 402. This can include querying active node 402 for any necessary data and/or communicating with another node in the computing network that maintains backup data from active node 402.

To complete the stateful switchover, the endpoints of communication dialogs facilitated by the active node 402 can be notified to discontinue use of the communication dialog facilitated by the active node 402 and to instead use a communication dialog facilitated by standby node 404. For example, standby node 404 can transmit a reroute message to gateway 406 and VOIP phone 408 that notifies the respective endpoints to discontinue use of communication dialog 412 facilitated by active node 402 and begin use of communication dialog 416 that is facilitated by standby node 404.

The reroute message can invite each endpoint to utilize a communication dialog 414 facilitated by standby node 402, as well as instruct the endpoints to cease use of the communication dialog 412 facilitated by active node 402. For, example, the reroute message can be similar to an invitation message and provide each endpoint with necessary data to initiate communication dialog 414, such as an identifier identifying communication dialog 414, data identifying standby node 404, data identifying the type of data to be exchanged, features to be provided, etc. Further, the reroute message can include data identifying the communication dialog 412 facilitated by active node 402, which the endpoints should cease using. For example the reroute message can include a header field that instructs the respective endpoint to cease use of the communication dialog identified by the header.

In some embodiments, the reroute message can be a SIP message that utilizes the REPLACES header. SIP may utilize headers to provide network traffic guidance for a communications system. An example of a SIP header is a REPLACES header. The REPLACES header may enable signaling communication from a standby server so that, for example, signaling can be retained after failure of an active node. Moreover, the REPLACES header can replace an existing SIP dialog with a different SIP dialog. An example use of the REPLACES header is to replace one participant with another in a multimedia conversation. The REPLACES header can also facilitate supplementary telephony services such as call hold, call transfer, call park, retrieve from park, transfer from park, call resume, transition from locally mixed conferences to two party calls, and the like. In some embodiments, there may be no influence by the REPLACES header on voice/data communication.

Furthermore, the REPLACES header may contain information used to match an existing SIP dialog, for example, call ID, to-tag, and from-tag, wherein call ID may be a unique identifier for a call or caller, the to-tag may be a desired destination for a call, and the from-tag may be a sender or location of the point of origin of a communication of the SIP dialog. In some embodiments, the REPLACES header can be used in conjunction with an INVITE request to facilitate replacement of an existing SIP dialog with a different SIP dialog. An INVITE request may provide a node of the communications system with the option of connecting to a requesting node by using the data provided in the INVITE request.

Upon receiving an INVITE request with a REPLACES header, a communication system can attempt to match the information in the INVITE request with a confirmed or early dialog. The communication system can match the to-tag and from-tag parameters as if they were tags present in an incoming request. In other words, the to-tag parameter may be compared to the local tag, and the from-tag parameter can be compared to the remote tag. The REPLACES header field may indicate that a single dialog identified by the header field is to be shut down and replaced by the incoming INVITE request in which it is contained. The REPLACES header field can also be encrypted as part of end-to-end signaling connection.

In some embodiments, active node 602 can assume the previous role of standby node 404 after the stateful switchover is completed. That is, active node 602 can begin copying network data from standby node 604, which is facilitating communication dialog 614, via checkpoint link 410, to act as a backup in case network interruption occurs at standby node 604. In some embodiments, standby node 604 can facilitate network communications and supplementary telephony services such as, for example, call hold, call transfer, call park, retrieve from park, transfer from park, and call resume functions, in a similar manner as active node 402 facilitated network communications and supplementary telephony services prior to the stateful switchover.

In some embodiments, stateful switchover may result in communication dialog 414 taking the place of communication dialog 412 such that network traffic transmitted between gateway 406 and VOIP phone 408 ceases to pass through communication dialog 412 and instead passes through communication dialog 414 facilitated by standby node 404.

The stateful switchover may increase network efficiency by preventing the loss and/or degradation of telephony services data due to extended network recovery time that may result from utilization of other methods of network recovery. By providing a standby node for active nodes of the communication system, network communication data loss can be reduced. This can improve any computer-related hardware that uses embodiments of the present technology by at least reducing the amount of processor computing cycles required to efficiently route network traffic data, thereby reducing wear on the processor, improving its functionality, and increasing the usable life of the processor itself.

Although FIGS. 4-6 show an example used to seamlessly transition a VOIP call in the event of a network interrupt, this is only one example and is not meant to be limiting. For example, in some embodiments, the present technology can be used in the context of video conferencing to provide a seamless transition of a communication dialog from a primary node to a replacement node in the event of a network interrupt or port/capacity escalation. In this type of scenario, a primary node can facilitate a communication dialog for a video/audio conference between multiple meeting participants. In the event that a network interrupt is detected or, alternatively, a port/capacity escalation is needed, the video/audio conference can be seamlessly transferred to a communication dialog facilitated by a replacement node. For example, a conference orchestrator can determine that the video/audio conference needs to be transitioned to a communication dialog facilitated by a replacement node and then prepare the replacement node. This can include configuring the replacement node based on the video/audio conference and meeting participants to seamlessly facilitate the video/audio conference. Once the replacement node is ready to begin the transition, the replacement node can transmit a reroute messages to the endpoints used for the video/audio conference. The reroute message can invite the endpoints to accept use of the communication dialog facilitated by the replacement node and cease use of the communication dialog facilitated by the primary node.

Figure 7:
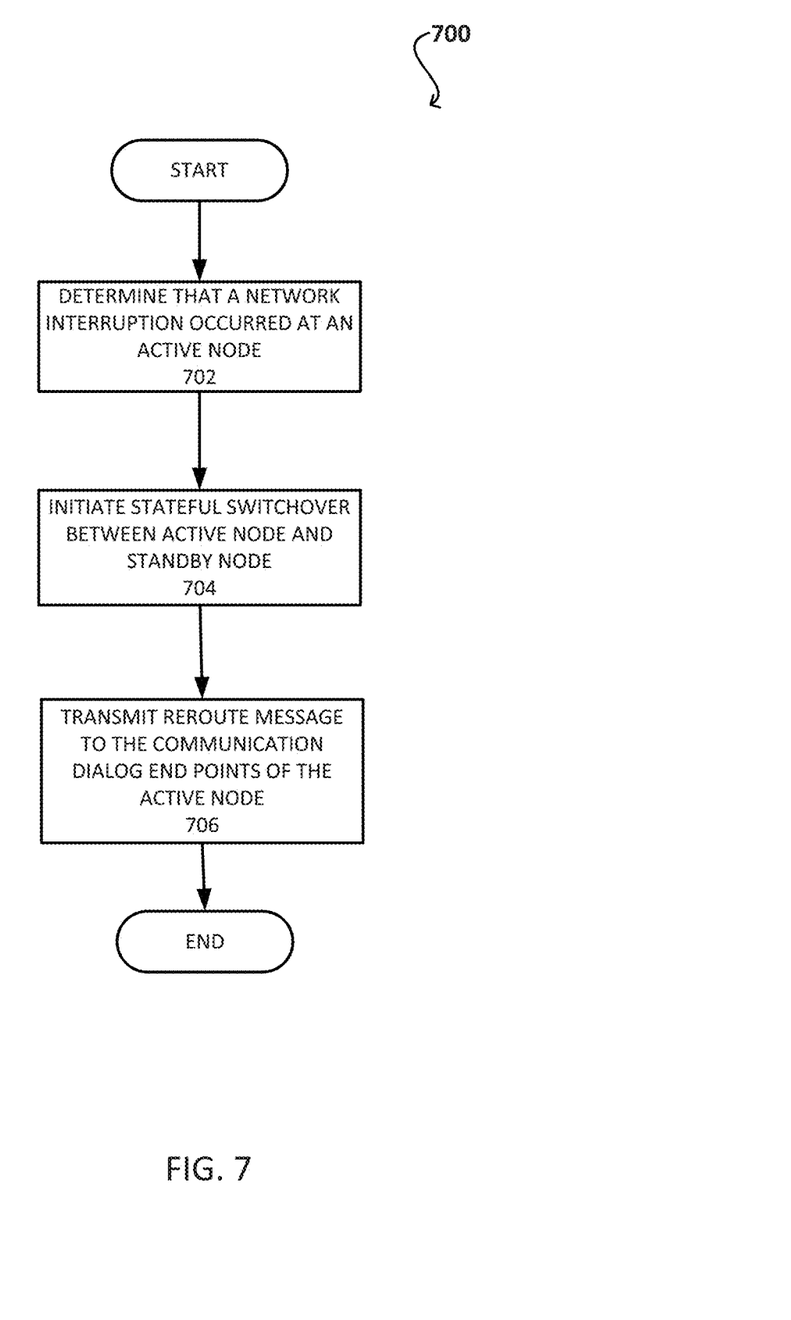
FIG. 7 illustrates an example procedure for supporting high availability of media products.

FIG. 7 illustrates an example procedure 700 for supporting high availability of media products such as voice, video, or similar data according to one or more embodiments of the present disclosure. The steps outlined herein are exemplary and can be implemented in any combination thereof, including combinations that exclude, add, or modify steps shown in FIG. 7.

Procedure 700 particularly illustrates steps that can provide redundancy and/or reduce downtime for a communication system in the event that a network interruption occurs. The example procedure begins at step 702 in which a network interruption may be determined at an active node of a communication system. Procedure 700 continues at step 704 wherein a stateful switchover is initiated between the active node and a standby node of the active node. Procedure 700 continues at step 706 wherein a reroute message is transmitted to the communication end points of the active node so that the active node is no longer used and so that the standby node takes the place of the active node.

It should be noted that while certain steps within procedure 700 may be optional as described above, the steps shown in FIG. 7 are merely examples for illustration, and steps may be included or excluded as desired. Further, while a particular order of the steps is shown, this ordering is merely illustrative, and any suitable arrangement of the steps may be utilized without departing from the scope of the embodiments described herein.

The techniques disclosed herein can provide high availability of network resources which may result in more efficient network routing and high availability of network applications and systems, which may result in fewer processor cycles required to route signals and thus improved efficiency of the network processors used to implement some embodiments of the present technology.

While there have been shown and described illustrative embodiments that support high availability using a session initiation protocol, it is to be understood that various other adaptations and modifications may be made within the spirit and scope of the embodiments herein. For example, the embodiments have been shown and described herein with relation to a particular communication system. However, the embodiments in their broader sense are not as limited, and may, in fact, be used with any number of communication systems.

Further, although the foregoing description has been directed to specific embodiments, it will be apparent that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include cloud-based media, magnetic or optical disks, flash memory, USB devices provided with non-volatile memory, networked storage devices, and the like. In addition, devices implementing methods according to these disclosures can comprise hardware, firmware and/or software, and can take any of a variety of form factors. Typical examples of such form factors include laptops, smart phones, tablets, wearable devices, small form factor personal computers, personal digital assistants, and the like. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    determining that a network interruption has occurred at an active node of a communication system, wherein the active node is facilitating a first communication dialog between a first end point and a second end point;
    in response to the network interruption, initiating a stateful switchover between the active node and a standby node of the communication system; and
    transmitting a reroute message to the first end point and the second end point, the reroute message instructing the first end point and the second end point to cease use of the first communication dialog and begin use of a second communication dialog, the second communication dialog facilitated by the standby node.

2. The method of claim 1, wherein the network interruption includes at least one of: failure of a network node, removal of the network node, or maintenance of the network node.

3. The method of claim 1, wherein the stateful switchover comprises:
    establishing the second communication dialog for use by the communication system traffic; and
    disconnecting the first communication dialog from the communication system traffic, wherein the stateful switchover provides uninterrupted communication system performance.

4. The method of claim 1, wherein the standby node is periodically updated with dialog information from the active node.

5. The method of claim 1, wherein the reroute message is a Session Inititation Protocol (SIP) message utilizing a Replaces header.

6. The method of claim 1, wherein supplementary telephony services of the first communication dialog are available for initiation and use during the second communication dialog.

7. The method of claim 1, further comprising:
    in response to the network interruption,
        establishing the standby node as a currently active node of the communication system traffic; and
        establishing the active node as a new standby node of the currently active node.

8. A network device comprising:
    a primary server for a first communication dialog;
    a backup server for a second communication dialog;
    one or more network interfaces to communicate in a communication system;
    a processor coupled to the one or more network interfaces and adapted to execute one or more processes; and
    a memory configured to store a process, the process, when executed by the processor, being operable to:
        determine that a network interruption has occurred at an active node of the communication system, wherein the active node is facilitating the first communication dialog between a first end point and a second end point;
        in response to the network interruption, initiate a stateful switchover between the active node and a standby node of the communication system, wherein the standby node is established as a currently active node of the communication system traffic and the active node is established as a new standby node of the currently active node; and
        transmit a reroute message to the first end point and the second end point, the reroute message instructing the first end point and the second end point to cease use of the first communication dialog and begin use of the second communication dialog, the second communication dialog facilitated by the standby node.

9. The network device of claim 8, wherein the network interruption includes at least one of: failure of a network node, removal of the network node, or maintenance of the network node.

10. The network device of claim 8, wherein the stateful switchover comprises:
    establishing the second communication dialog for use by the communication system traffic; and
    disconnecting the first communication dialog from the communication system traffic, wherein the stateful switchover provides uninterrupted communication system performance.

11. The network device of claim 8, wherein the standby node is periodically updated with dialog information from the active node.

12. The network device of claim 8, wherein the reroute message is a Session Initiation Protocol (SIP) message utilizing a Replaces header.

13. The network device of claim 8, wherein supplementary telephony services of the first communication dialog are available for initiation and use during the second communication dialog.

14. A tangible, non-transitory, computer-readable medium having instructions
    encoded thereon, the instructions, when executed by a processor, operable to:
        determine that a network interruption has occurred at an active node of a communication system, wherein the active node is facilitating a first communication dialog between a first end point and a second end point;
        in response to the network interruption, initiate a stateful switchover between the active node and a standby node of the communication system; and
        transmit a reroute message to the first end point and the second end point, the reroute message instructing the first end point and the second end point to cease use of the first communication dialog and begin use of a second communication dialog, the second communication dialog facilitated by the standby node.

15. The non-transitory, computer-readable medium of claim 14, wherein the network interruption includes at least one of: failure of a network node, removal of the network node, or maintenance of the network node.

16. The non-transitory, computer-readable medium of claim 14, wherein the stateful switchover comprises:
    establishing the second communication dialog for use by the communication system traffic; and
    disconnecting the first communication dialog from the communication system traffic, wherein the stateful switchover provides uninterrupted communication system performance.

17. The non-transitory, computer-readable medium of claim 14, wherein the standby node is periodically updated with dialog information from the active node.

18. The non-transitory, computer-readable medium of claim 14, wherein the reroute message is a Session Inititation Protocol (SIP) message utilizing a Replaces header.

19. The non-transitory, computer-readable medium of claim 14, wherein supplementary telephony services of the first communication dialog are available for initiation and use during the second communication dialog.

20. The non-transitory, computer-readable medium of claim 14, wherein the instructions are operable to:
    in response to the network interruption,
        establish the standby node as a currently active node of the communication system traffic; and
        establish the active node as a new standby node of the currently active node.

* * * * *